May 12, 1953  H. SCHRÖDER  2,638,030
BEAM SPLITTING MEANS
Filed Dec. 24, 1949
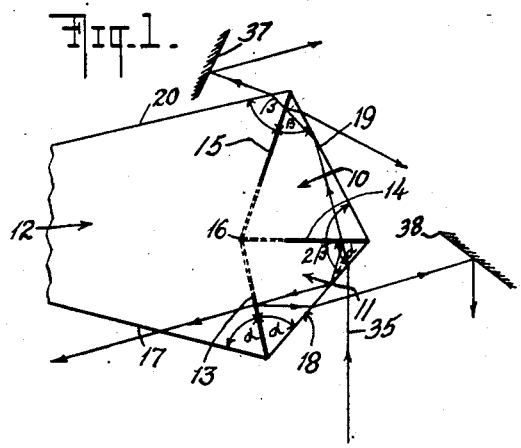
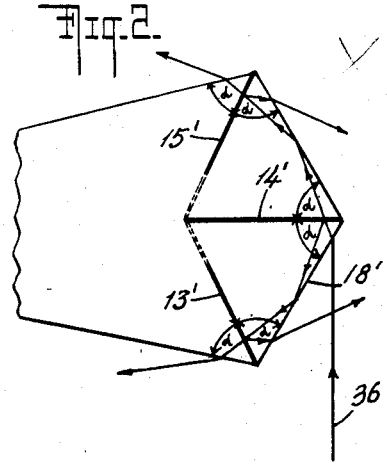
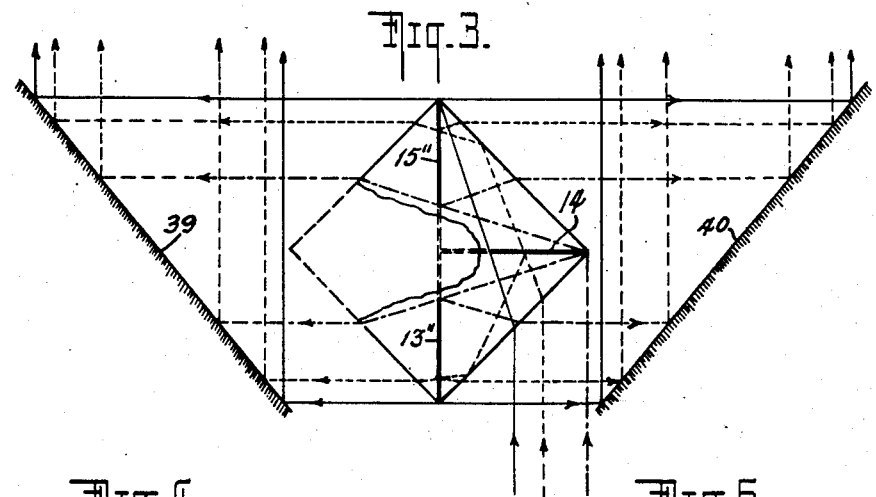
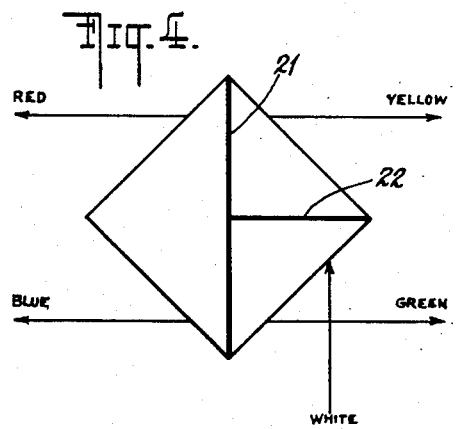
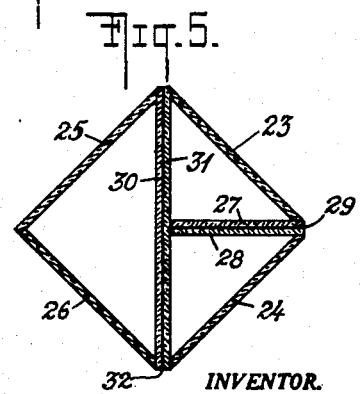
INVENTOR.
HUBERT SCHRÖDER
BY
ATTORNEY Patented May 12, 1953

2,638,030

UNITED STATES PATENT OFFICE 2,638,030

BEAM SPLITTING MEANS

Hubert Schröder, Munich, Germany, assignor to Fish-Schurman Corporation, New York, N. Y., a corporation of New York Application December 24, 1949, Serial No. 134,886
In Germany December 27, 1948

14 Claims. (Cl. 88—1)

This invention relates to an improved means for splitting a light beam into a plurality of beams of the same or different colors.

The introduction of interference filters for splitting light beams has considerably improved the possibilities of obtaining split light beams with no appreciable absorption of light, particularly in color photography. Heretofore, such filters were arranged in a manner analogous to the conventional arrangements of regular beam splitting mirrors, said filters being deposited either on plates placed in the path of the beam at an angle of 45 degrees, or between prisms, so that they were disposed at the same angle. One of the disadvantages of the aforesaid plate arrangement is that the images are not projected in the same plane because of the different optical path lengths and that the images reflected on the reverse sides of the plates are superimposed upon them. In the said prism arrangement, the effect of the interference films is diminished, because the polarization becomes quite prominent in the 45 degree incidence angle range, also there is light loss due to the approach towards total reflection.

An object of the present invention is to provide an improved beam splitting medium which will be free of the above mentioned disadvantages and which will possess advantages over prior arrangements of this type.

Another object of the invention is to provide a beam splitting means in which the beam splitting interference films are so arranged that the angles of incidence are small whereby harmful polarization effects are excluded while best filter effects are obtained and whereby the production of color effects is considerably facilitated.

A further object of the invention is to provide an improved beam splitting means which makes possible color separation without substantial light absorption and without the need for additional filtering.

A still further object of the invention is to provide an improved beam splitting means in which the angles of incidence and emergence in such means may be the same for all split beams.

A still further object of the invention is to provide an improved beam splitting means in which the beam or optical paths may be kept equal for all images and by which several images may be projected onto one plane.

A still further object of the invention is to provide an improved beam splitting medium which in itself will be capable of producing several kinds of color separation.

Other objects of the invention as well as the advantages thereof will become apparent to those skilled in the art, from a reading of the following specification and an inspection of the accompanying drawing in which Fig. 1 shows schematically a beam splitter made in accordance with the invention; Figs. 2, 3 and 4 are views similar to Fig. 1, but show different arrangements of the interference film systems, and Fig. 5 is a schematic view of still another manner in which the invention may be practiced.

In accordance with the present invention, the above objects are preferably attained either separately or simultaneously by embedding or depositing one or several (multi-layer) suitable interference films between parallelly disposed planes or surfaces of transparent, preferably triangular prisms, the angle of incidence for the beam to be split being not more than 40 degrees at each interference film measured in the prism body, and preferably not more than 20 degrees.

Fig. 1 shows a beam splitting arrangement adapted to split a light beam twice, three or four times. In this arrangement, the angles of incidence into and emergence from the splitting medium may be equal for all split beams. Referring more particularly to Fig. 1, the numerals 10, 11 and 12 designate generally three optical prisms cemented together. Provided between the parallel surfaces of prisms 11 and 12 is a multi-layer interference film system 13. A second multi-layer interference film system 14 is provided between the parallel surfaces of prisms 10 and 11, and a third multi-layer interference film system 15 is provided between two parallel, opposed surfaces of prisms 10 and 12. The three different interference film systems 13, 14 and 15 intersect, at least along their extensions, as is indicated in dotted outline, along the same straight line or axis 16 of the beam splitter, as is shown in Fig. 1, or along different straight lines parallel to such axis 16. The interference filters 13, 14 and 15 are so embedded between prisms 12, 11; 10, 11 and 10, 12 respectively, that, viewed in a section parallel to the incidence plane, the two prism planes or surfaces 17, 18 which intersect outside said intersecting axis 16 or the said parallel straight lines, intersect with the interference film system 13 at the same angle $a$. Also, one of such two prism surfaces, surface 18, which preferably serves as the surface through which the light beam enters the beam splitter, intersects with interference film system 14 at the same angle ($a$). The two prism surfaces 19 and 20 which intersect outside said intersecting axis 16 or the said parallel straight lines intersect with the interference film system 15 at the same angle β. The prism surfaces 18, 19 and 19, 20 respectively, which do not contain the intersecting axis 16 or the said intersecting lines, form equal angles 2β.

An incoming beam of light 35 striking the surface 18 of the composite prism will be refracted into the prism 11 and directed toward the film 14. Some radiation passes through film 14 and some reflects from film 14. That portion of the beam transmitted through film 14 passes through prism 10 and is reflected by surface 19 toward film 15. Part of the radiation traveling through prism 10 passes through film 15 and prism 12 and is refracted into the atmosphere at surface 20. The part of the radiation which is reflected by film 15, returns through prism 10 and is refracted into the atmosphere at surface 19 of such prism. The portion of the beam 35 reflected by film 14, returns through prism 11 to surface 18 where it is reflected by the latter toward film 13. At film 13 a part of the radiation passes through such film and prism 12 and is refracted into the atmosphere at surface 17. The portion of the radiation which is reflected by film 13 returns through prism 11 and is refracted into the atmosphere at surface 18.

In many instances, further symmetry of the arrangement may be desired, and light or optical paths of equal lengths for all split beams in the splitting medium may be required. This is accomplished in accordance with the invention by arranging the above described optical system symmetrically in relation to the interference film system 14, whereby angle β equals angle α. This arrangement is shown in Fig. 2 of the drawing in which interference filter systems 13', 14' and 15' correspond to the aforesaid filter systems 13, 14 and 15, respectively, but are disposed so that each form equal angles of intersection α with adjacent sides of the prisms. A light beam 36 striking surface 18' of this composite prism is split in the same manner described with respect to beam 35.

It is furthermore of particular advantage to combine several images in one plane. This is obtained if, in addition to arranging the optical system shown in Fig. 1, so that it is symmetrical with relation to the interference film system 14, the three interference film systems 13, 14 and 15 intersect at right angles and in one line, at least in their assumed extensions. The optical system of this embodiment may have the form of a cube, as is shown for instance, in Fig. 3 of the drawings. In this figure, which shows the entire beam splitting, interference filter systems 13", 14" and 15" correspond to the aforesaid interference filter systems 13, 14 and 15, respectively. It will also be noted that in the construction shown in Fig. 3 interference filter systems 13" and 15" may be replaced by a single interference filter system, as is shown in Figs. 4 and 5 of the drawings. Thus, two, three or fourfold splitting of the light beam may be attained with only two interference filter systems arranged to provide small angles of incidence.

The arrangement above described results in two upright and two reversed images. The reversed images may easily be uprighted by mirrors (note mirrors 37 and 38 in Fig. 1 of the drawings) or reversing prisms and, if desired, the two other beam paths may be equalized in optical length by interposing additional glass bodies in a manner well known in the art. These means may suitably also be used to combine several part images in one plane. In the embodiment using the cubic arrangement, this may particularly simply be done by arranging two plane mirrors which are placed parallel and at right angles, respectively, to the incidence plane of the light beams (note mirrors 39 and 40 in Fig. 3 of the drawings).

If the desired splitting of the light beams also includes a splitting into different colors, it is, for reasons of maximum light gain, particularly advantageous to choose the interference film systems so that they themselves cause the desired color separation, and to use additional color filters only if needed for the purposes of spectral correction. In the case of light beam splitting by three interference systems, it is preferred to form the central system 14 as selective reflector for two of the desired colors, i. e., blue and green, the system 13 selectively reflecting one of said colors, and the system 15 selectively reflecting the color filtered through system 14. If the symmetrical cubic arrangement is used in connection with selectively reflecting interference layer systems as splitting media, the surprising result is obtained that, merely by turning the same splitting body around two of its central axes, eight different kinds of color separation may be accomplished with no appreciable absorption of light. It is also possible to obtain with such a body simultaneously two, three and four color separation, the total light being in each case distributed over two, three or four part images. In order to prevent absorption even further, it is preferred to remove from the outer surface of the splitting body any reflecting quality by any method known to the prior art.

The embodiment shown in Fig. 4 of the drawings, as has previously been mentioned, has but two interference filters, 21 and 22. As an instance of the manner in which the light beam may be split into different colors, assume that filter 22 is a blue-green reflector and filter 21 is a green-yellow reflector. This may be realized by making each filter of eight layers of ZnS and cryolite, and in each of which the 1st, 3rd, 5th and 7th layers are ZnS layers of ¾ wave length (λ) optical thickness and the 2nd, 4th and 6th layers are made of cryolite and have an optical thickness of ¼ wave length (λ); the 8th layer being made of cryolite, so as to have an optical thickness of ⅛ wave length (λ). (λ) refers to the spectral center, properly adjusted by suitable filters. In other words, filter 22 to about 490 m$\mu$ and filter 21 to about 560 m$\mu$. With this arrangement, the white beam of light will be split into the different color beams shown in Fig. 4 of the drawings.

The advantage of small angles of incidence for the interference filters becomes, as calculation proves, the more significant the lower the refractive index of the prisms adjacent the filters. Therefore, it is preferred to use as filters liquids of low refractive index, such for instance, as water or methyl alcohol, which are embedded between the plane plates, and this offers the additional advantage of great economy in weight if the arrangement is used for splitting light beams of considerable cross section. Such a construction is illustrated in Fig. 5 of the drawings in which the numerals 23, 24, 25 and 26 designate four transparent plates of glass connected together to provide an optical system in the form of a cube. Intermediate the plates 23 and 24 is provided an interference filter system composed of transparent glass plates 27 and 28 intermediate which is provided a single layer or multi-layer interference film 29. Disposed at right angles to such system is a second interference filter system composed of transparent glass plates 30 and 31 intermediate which is provided one or more layers of interference film 32. The two said interference filter systems are connected in fluid-tight relation to plates 23, 24, 25 and 26 and the end walls (not shown) of the beam splitter device, so as to provide three fluid-tight chambers which may be filled with any suitable fluid. Such a device will operate in accordance with the invention and will have the aforesaid advantages.

While I have hereinabove described and illustrated preferred embodiments of my invention, it will be apparent to those skilled in the art that various changes and modifications thereof may be made without departing from the spirit or scope of the invention. Thus, in Fig. 3 which illustrates the invention in connection with a light splitting cube, it will be apparent that the entire body of the cube is not used and that a part thereof may therefore be eliminated to obtain further weight economy. The portion of the cube body that may be eliminated is indicated in this figure by the broken line. It might also be pointed out that a splitting system wherein the filters are merely deposited on plane plates without filling the prismatic space is possible only with very unsymmetrical arrangements with small aperture. In contrast thereto, the light splitting cubes of Fig. 3 result in a symmetrical projection of two images in one plane, whereby it is simple to combine all four part images in one plane by means of deflecting mirrors. Possible chromatic focus difference for the several colors may be corrected by inserting additional thin plane plates.

I claim:

1. An optical system for deflected light paths capable of splitting light beams into at least two beams comprising three optical prisms cemented together and three interference films located between adjacent cemented surfaces of said prisms, each of said films being contained in a plane which intersects the plane containing another of said films along a straight line disposed at right angles to the incident plane of the composite prism, the plane of one of said films being intersected at the same angle α by two prism surfaces which intersect such plane outside the said line of intersection of such plane with the plane of another film, the plane of a second film being intersected at the same angle α by one of said two prism surfaces, and the plane of the third film being intersected at the same angle β by two other prism surfaces which intersect such plane outside the said line of intersection of such plane with the plane of another film, said last three mentioned prism surfaces intersecting the planes of said second and third mentioned films to form equal angles 2β between each adjacent pair of such surfaces, the outer surface of the prism whose isosceles sides are in contact with said first and second mentioned interference films forming the incident side of the composite prism and the light impinging on such outer surface being split by said second mentioned film into two parts which are totally reflected towards said first and third mentioned films by the outer surfaces of such entrance prism and the adjacent prism whose inner surfaces are in contact with said second and third mentioned interference films, the component beams being each split into two parts by said first and third mentioned interference films, the split part of the component beam reflected by said first mentioned interference film leaving the composite prism through the outer surface of said entrance prism and the split part of the component beam reflected by said third mentioned interference film leaving the composite prism through the outer surface of said adjacent prism, the split parts of the component beams passing through said first and third mentioned films leaving the composite prism through the adjacent outer surfaces of the third prism, and said interference films each consisting of a plurality of alternate layers of material having high and low index of refraction compared to that of the composite prism and capable of interference of the light to be split.

2. An optical system for deflected light paths capable of splitting a light beam into at least two beams comprising three optical prisms having opposed adjacent surfaces cemented together to form a composite prism and at least two interference films located between such adjacent cemented surfaces, each of said films being contained in a plane which intersects the plane containing another of said films along a straight line disposed at right angles to the incident plane of the composite prism, the plane of the interference film between two of said optical prisms being intersected at the same angle α by two adjacent exterior surfaces of such prisms, the plane of the interference film between one of said two prisms and the third prism being intersected at the same angle α by the exterior surface of the former, and the plane of the film between the third prism and the other of said two prisms being intersected at the same angle β by adjacent exterior surfaces of such third and other prisms, the lines of intersection of said four prism surfaces with said planes being outside the lines of intersection of said planes with one another and said last three mentioned prism surfaces intersecting the planes of the films between one of said two prisms and the third prism and between the third prism and the other of said two prisms to form equal angles 2β between each adjacent pair of such three surfaces, the outer surface of the prism whose isosceles sides are in contact with said first and second mentioned interference films forming the incident side of the composite prism and the light impinging on such outer surface being split by said second mentioned film into two parts which are totally reflected towards said first and third mentioned films by the outer surfaces of such entrance prism and the adjacent prism whose inner surfaces are in contact with said second and third mentioned interference films, the component beams being each split into two parts by said first and third mentioned interference films, the split part of the component beam reflected by said first mentioned interference film leaving the composite prism through the outer surface of said entrance prism and the split part of the component beam reflected by said third mentioned interference film leaving the composite prism through the outer surface of said adjacent prism, the split parts of the component beams passing through said first and third mentioned films leaving the composite prism through the adjacent outer surfaces of the third prism, and said interference films each consisting of a plurality of alternate layers of material having high and low index of refraction compared to that of the composite prism and capable of interference of the light to be split.

3. An optical system such as defined in claim 1, in which said first and third mentioned interference films and said prism planes are arranged in symmetry relative to said second mentioned interference film.

4. An optical system such as defined in claim 1, in which said three interference films, at least in their extensions, intersect at right angles in one straight line so that the optical system has the form of a cube.

5. An optical system such as defined in claim 2, including optical means for reversing reversedly projected images.

6. An optical system such as defined in claim 2, including optical deflecting means for combining several part images in one plane.

7. An optical system such as defined in claim 2, including optical deflecting means and light path compensation means for combining several part images in one plane.

8. An optical system such as defined in claim 2, in which said films are selectively reflecting or absorbing multi-layer interference films adapted to separate the beams into different color beams.

9. An optical system such as defined in claim 2, in which one of said films is a multi-layer interference film capable of selectively reflecting at least two color regions.

10. An optical system such as defined in claim 2, in which said transparent media is composed of material of low refractive index.

11. An optical device such as defined in claim 2, in which at least one of said interference films is arranged to form an angle of incidence of not more than 40 degrees with the beam to be split.

12. An optical device such as defined in claim 2, in which at least one of said interference films is a plane, multi-layer interference film arranged to form an angle of incidence of not more than 40 degrees with the beam to be split.

13. An optical device such as defined in claim 2, in which one of said interference films is arranged to form an angle of incidence of not more than 20 degrees with the beam to be split.

14. An optical device such as defined in claim 2, in which at least one of said prisms is composed of a plurality of transparent optical glass plates connected together to form a chamber and a transparent media of low refractive index contained within the chamber formed by said plates.

HUBERT SCHRÖDER.

References Cited in the file of this patent

UNITED STATES PATENTS

| Number | Name | Date |
|---|---|---|
| 1,429,495 | Douglass | Sept. 19, 1922 |
| 2,182,142 | Ball et al. | Dec. 5, 1939 |
| 2,189,932 | Ball et al. | Feb. 13, 1940 |
| 2,352,777 | Douden | July 4, 1944 |
| 2,373,249 | Lurcott | Apr. 10, 1945 |
| 2,418,627 | Dimmick | Apr. 8, 1947 |
| 2,449,287 | Flood | Sept. 14, 1948 |

FOREIGN PATENTS

| Number | Country | Date |
|---|---|---|
| 18,256 | Great Britain | Aug. 11, 1913 |
| 475,415 | Great Britain | Nov. 15, 1937 |
| 548,018 | Germany | Apr. 12, 1932 |
| 678,764 | Germany | July 20, 1939 |